Figure 3:
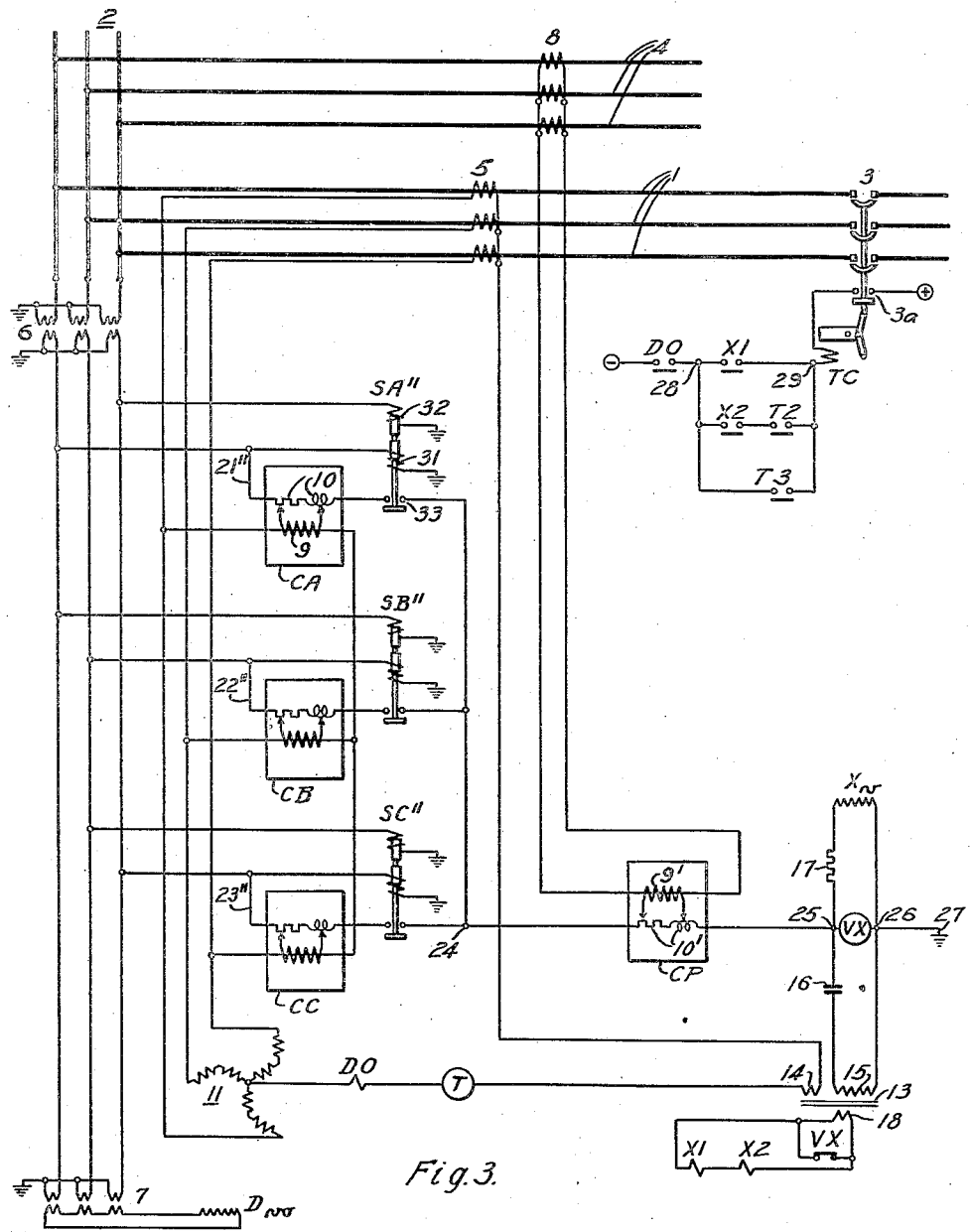

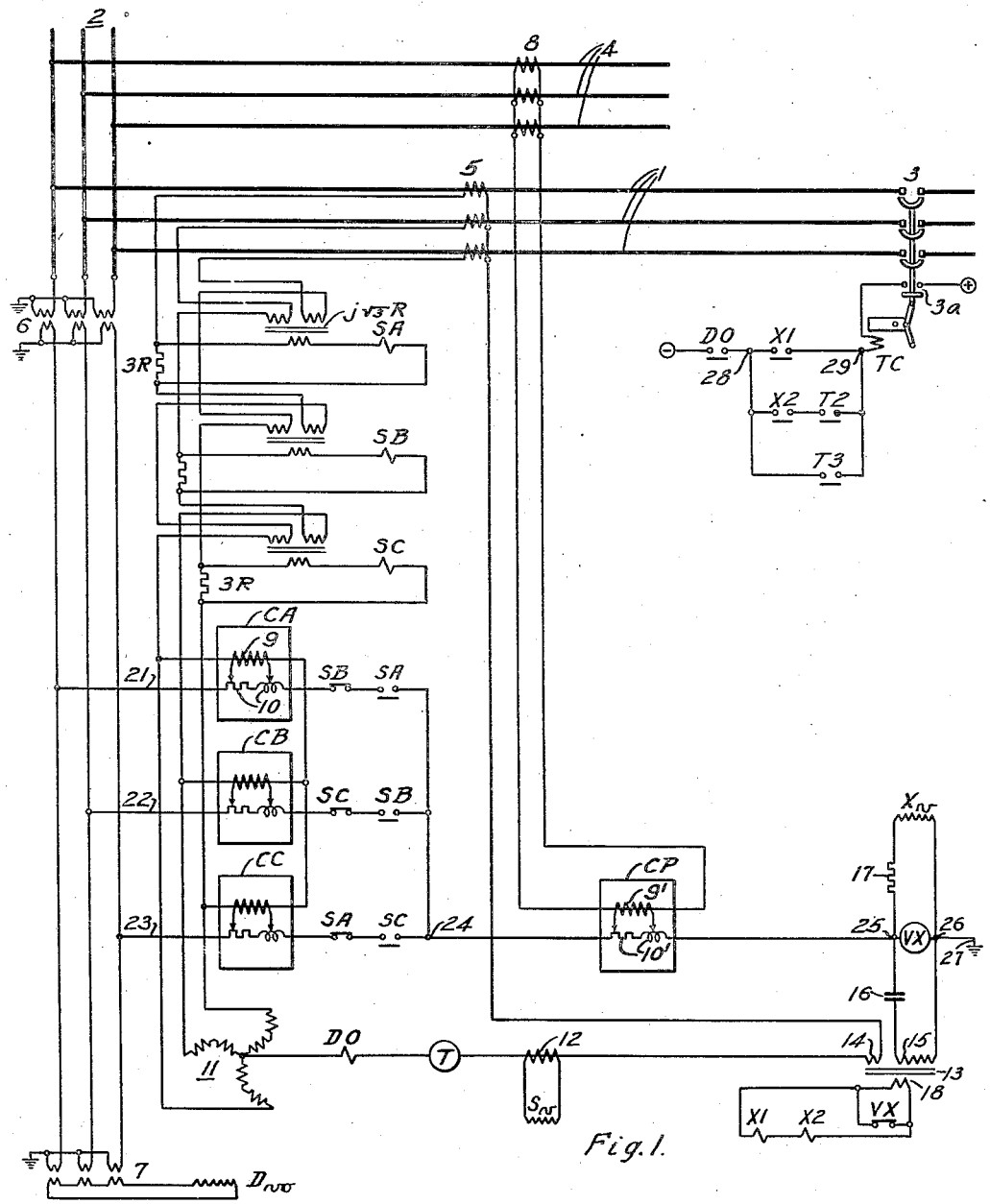
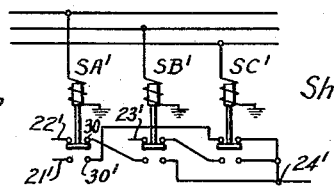

Patented Sept. 24, 1946

2,408,208

UNITED STATES PATENT OFFICE 2,408,208

SIMPLIFIED GROUND RELAY

Shirley L. Goldsborough, Basking Ridge, N. J., assignor to Westinghouse Electric Corporation, East Pittsburgh, Pa., a corporation of Pennsylvania Application February 10, 1944, Serial No. 521,801

20 Claims. (Cl. 175—294)

My invention relates to a protective relaying system and apparatus for providing a distance-response to ground-faults on a polyphase transmission line.

The principal object of my invention is to provide a simplified reactance ground relay which utilizes only one reactance element, or two elements if a second-zone response is required as well as a first-zone response.

A further object of my invention is to provide a simplified reactance ground-relay system which requires no supervision by a sensitive impedance element.

Heretofore, reactance ground relays, such as those shown, for example, in the Lewis Patent 1,897,022, granted February 7, 1933, and assigned to the Westinghouse Electric & Manufacturing Company, have required a separate relaying equipment for each phase, because the measurement of distance during ground-faults necessitates a comparison of the line-to-ground voltage, on the faulted phase, with either the line-current on that phase, or the residual current, or a mixture of both currents. This system was quite complicated, and expensive. As actually utilized, it also required a sensitive or third-zone impedance-element for supervising the reactance-elements in order to prevent them from operating on normal load-currents. This impedance-element had to be sufficiently sensitive to respond to light ground-faults, and yet not so sensitive as to respond to load-currents, thereby presenting conflicting conditions which were sometimes impossible of fulfillment.

An object of my present invention is to provide phase-selectors, in combination with a single reactance element, or two reactance elements if first and second-zone responses are required, said phase-selectors being utilized to detect a ground-fault and to select the proper line-to-ground voltage to be applied to the reactance-element or elements.

A further object of the present invention is to utilize, as a phase-selector, a differential relay comparing two phases of a polyphase quantity, either current or voltage, preferably the latter, derived from the line, these two phases being preferably so chosen that, in the event of a double line-to-ground fault, the leading faulted phase will be selected.

With the foregoing and other objects in view, my invention consists in the systems, circuits, combinations, elements and methods hereinafter described and claimed, and illustrated in the accompanying drawings, wherein Figure 1 is a diagrammatic view of circuits and apparatus illustrating my invention in a form of embodiment which is preferred on systems which are grounded through resistance.

Fig. 2 is a diagrammatic view illustrating a different form of phase-selector which can be utilized instead of the phase-selectors shown in Fig. 1, and Fig. 3 is a diagrammatic view, similar to Fig. 1, showing a still further alternative in regard to the phase-selectors.

I have illustrated my invention in Fig. 1 as being applied to the protection of a line-section 1, which may be a part of a three-phase, 60-cycle transmission or distribution system. The three-phase line 1 is connected to a three-phase bus 2 through line-segregating circuit-interrupting means such as a three-phase circuit-breaker 3, which is illustrated as having an auxiliary make-contact 3a and a trip-coil TC. In the general case, there are also one or more parallel lines 4, paralleling the protected line-section 1, as shown in the drawings.

The three-phase relaying currents and voltages are derived from the line by means of line-current transformers 5 and potential transformers 6, respectively, for responding to the line-current and to the line-voltage. A bank of auxiliary potential transformers 7 may also be energized from the potential transformers 6 for providing a response to the zero-sequence voltage-component. The parallel line 4 is also provided with line-current transformers 8.

When the relaying equipment is utilized for the protection of a power-system which is grounded at more than one point, or which otherwise involves errors in ground-fault distance-measurement due to the manner in which the positive, negative, and zero-sequence currents distribute themselves, it is necessary to utilize some sort of compensating means as set forth in the aforesaid Lewis patent 1,897,022. By way of illustration, I have chosen the voltage-compensator method which is shown in Fig. 9 of the Lewis patent.

As shown in the accompanying drawings, the illustrated compensating method utilizes three compensators CA, CB and CC, one for each phase, and when there is a parallel line such as the line 4, another compensator CP, one for each of the parallel lines. The three phase-responsive compensators CA, CB and CC have auxiliary current-transformers 9 which are energized from the respective phase-currents of the line, from which the zero-sequence component has been removed.

and these auxiliary current-transformers 9 are utilized to energize suitable impedances 10, which are adjustable as to phase and magnitude, so as to produce the proper voltage-drop for compensating the relaying voltage. In the case of the parallel-line compensator CP, the auxiliary current-transformer 9' is energized from the residual current of the line-current transformers 8 in the parallel line-section 4, and this auxiliary current-transformer 9' energizes an adjustable impedance 10' for producing a corresponding compensating voltage-drop. The zero-sequence current-component is withdrawn from the relaying currents of the protected line-section 1 by means of a suitable grounding-transformer such as an interconnected-star bank 11.

In the relaying system which is shown in Fig. 1, I have shown only the ground-fault relays, as my invention relates solely to these relays. It is to be understood, of course, that the usual relays for phase-fault protection will be utilized, in addition to the illustrated ground-fault relays. I have also, for the sake of simplicity, illustrated my invention in a relaying system which does not utilize carrier-current or any equivalent means for obtaining simultaneous tripping at both ends of the protected line-section, or for otherwise obtaining a response, at the relaying station, to conditions existing at the remote-end terminal of the protected line-section. It is to be understood, however, that my relaying system is applicable also to carrier-current relaying-systems, and the like. I have also, for the sake of simplicity, illustrated my invention as being applied to a gang-tripping system, in which all poles of the circuit breaker 3 are opened simultaneously, but it is to be understood that my invention is equally applicable to the single-pole tripping-system which is described and claimed in my Patent 2,320,861, granted June 1, 1943.

The simple relaying system which is shown in Fig. 1 utilizes a single first-zone reactance-element X1, for responding to faults up to a distance of about 80%, more or less, of the length of the protected line-section, and a similar second-zone reactance-element X2, which reaches out to faults beyond the far end of the line-section. These reactance elements are differential relays having make-contacts and operating coils which are sufficiently designated by the relay-designations X1 and X2, respectively, and they have voltage-responsive restraining-coils which are collectively designated by the designation $X_v$.

I also utilize a ground-directional element DO which is illustrated as having a residual-current operating-coil DO and a residual-voltage polarizing-coil $D_{vo}$.

My invention also utilizes some suitable form of ground-fault selector-means, for determining which phase is faulted, in the event of a single line-to-ground fault. Several suitable ground-fault selectors are shown, in the elements SA, SB and SC of my aforementioned Patent 2,320,861, or sensitive ground-fault reactance-elements may be utilized for this purpose.

In Fig. 1, I have chosen to illustrate three ground-fault phase-selectors SA, SB and SC, which compare the phase or direction of the negative-sequence component of the line-current with the zero sequence component of the line-current. I obtain the negative-sequence component for each phase by adding the voltage-drop produced by passing the line-current of that phase through a resistor $3R$, to the voltage-drop which is obtained by passing the difference between the other two line-currents through an impedance $j\sqrt{3R}$, as described and claimed in the Lenehan Patent 2,309,649, granted February 2, 1943, and assigned to the Westinghouse Electric & Manufacturing Company. Thus, the operating coil SA of the phase-A selector, is energized so as to be responsive to $3RI_a+j\sqrt{3R}(I_c-I_b)$. The voltage-coils or polarizing-windings of the three phase-selectors SA, SB and SC are grouped together under the designation $S_v$, and energized by means of an auxiliary current-transformer 12 in the residual-current connections of the line-current transformers 5. It will be understood that the selector-elements SA, SB and SC are directional or wattmetric elements, comparing the phases of the currents in their respective windings.

My relaying equipment, as illustrated in Fig. 1, also includes an auxiliary ground-voltage relay VX, having an operating coil VX and a back-contact VX. I also utilize a ground-current-energized timer T, having an energizing winding T, and two timer-contacts T2 and T3, which close at successive times corresponding to the back-up time-delays for second-zone and third-zone protection, respectively.

In accordance with my invention as shown in Fig. 1, I utilize the phase-selectors SA, SB and SC to determine which of the line-to-ground voltages shall be applied to the reactance-elements X1 and X2. I prefer, also, to utilize some means for either preventing an effective operation of the reactance-elements X1 and X2 on ground-faults involving two or more of the line-conductors, or choosing the energization so that the reactance-relays under-respond instead of over-respond. An analysis of the action of a ground-fault reactance-element, on double-ground faults, shows that if the relay has a restraint in response to the leading one of the two phase-to-ground voltages which are affected by the fault, the balance-point of the relay will be closer to the relay than in the case of a single line-to-ground fault, whereas, if the relay has a restraint in response to the lagging phase-to-ground voltage, the balance-point will shift further away from the relays than the balance-point on single ground-faults. Thus, for example, on a double-ground fault involving phases B and C, a reactance relay which is operated by residual current and restrained by the phase-B line-to-ground voltage will under-respond, whereas the phase-C relay will over respond.

In accordance with my invention, I contemplate that phase-faults shall be taken care of by phase-fault relays (not shown). It is not my object to respond to double line-to-ground faults. A proper response of the ground-distance reactance-relays X1 and X2, to double-ground faults, will not be objectionable, but there is a very strong objection to an improper response which responds as if a double-ground fault were closer to the relay than it really is. I therefore arrange my relay-connections so that the reactance elements under-respond, rather than over-respond, if they respond at all, in the event of a double line-to-ground fault.

The particular phase-selectors SA, SB and SC, which I have illustrated, and which directionally compare the negative and zero-sequence components, do not properly respond to the faulted phases, however, on double-ground faults. On a solidly grounded system, with a resistanceless double-ground fault, the sequence-selector operation is as explained in connection with Fig. 10 of my Patent 2,320,861; that is, the phase-selector corresponding to the sound phase responds, in such a case, just as if there were a single ground-fault on the sound phase, and neither one of the two phase-selectors in the faulted phases responds at all. This may represent an inoperative or unsafe condition, because of the tendency of the ground-fault reactance-element to over-reach, when energized with the line-to-ground voltage of the sound phase, and hence I prefer to limit the application of my sequence-selector embodiment of my invention, as shown in Fig. 1, to the protection of resistance-grounded systems, where the zero-sequence current is so out of phase with the negative-sequence current that the phase-selector corresponding to the leading one of the two faulted phases will respond, in addition to the phase-selector corresponding to the sound or unfaulted phase.

Thus, as shown in the drawings, I utilize two of the phase-selector contacts, in series with each phase of the relaying voltage, namely, a make-contact of the phase-selector for that phase, and a back-contact of the phase-selector for the next lagging phase. In this manner, if the fault involves only one phase, I select the proper phase for application to the reactance-elements X1 and X2. If the fault involves two phases, I select the line-to-ground voltage of the leading faulted phase, because the selector in the lagging faulted phase does not respond. In this way, I make sure that there is no over-response on double line-to-ground faults.

On a three-phase fault involving ground-current, there is no response at all, if the back-contacts of all three of the phase-selectors properly respond by opening. Otherwise, one phase may be more or less arbitrarily selected.

The reactance elements X1 and X2, which are illustrated in the drawings are of a differential type which is described and claimed in a Lewis Patent 1,967,093, granted July 17, 1934, and assigned to the Westinghouse Electric & Manufacturing Company. That is, their operating windings X1 and X2 are each energized so as to be responsive both to current and voltage, or rather to the vectorial sum of current and voltage. In order to obtain such a response, I have shown a mixing transformer 13 for energizing the operating coils X1 and X2 of the reactance elements. The mixing transformer 13 has two primary windings 14 and 15. The first primary winding 14 is a current-responsive winding which is connected in the residual-current circuit of the line-current transformers 5. The other primary winding 15 is a voltage-responsive winding which is energized from the applied relay-voltage through a phase-advancing means such as a capacitor 16. The restraining winding $X_v$ of the reactance elements X1 and X2 is energized from the same voltage, through a resistor 17 which keeps the exciting currents approximately in phase with the applied voltage.

In the particular form of embodiment of my invention shown in the drawings, the auxiliary voltage-relay VX is energized from the voltage which is applied to the reactance element, and it has its back-contact VX connected across the secondary winding 18 of the mixing-transformer 13 so as to prevent the reactance-elements X1 and X2 from responding on current-energization alone, in the fraction of a cycle which is required before a restraining-voltage is applied thereto by the closure of one of the make-contacts of one of the three phase-selectors SA, SB and SC.

The energizing circuits for the reactance-elements X1 and X2 can be more fully described as follows. The three phase-to-ground voltage-circuits are shown at 21, 22, and 23, for phases A, B and C, respectively. Connected in series with the phase-A circuit 21, is the impedance-element 10 of the phase-A compensator CA, the back-contact SB of the phase-B selector SB, and the make-contact SA of the phase-A selector SA. The phase-B circuit 22 similarly includes the impedance of the phase-B compensator CB, the back-contact SC, and the make-contact SB. The phase-C circuit 23 similarly includes the impedance of the phase-C compensator CC, the back-contact SA and the make-contact SC. These three circuits are connected in parallel to each other at the point 24, from which point the circuit continues through the impedance 10' of the other-line compensator CP, and thence to the relaying point 25 which constitutes one of the terminals of the compensated relaying voltage which is applied to the reactance-elements X1 and X2 and to the auxiliary voltage-relay VX. The other terminal of the relaying voltage is indicated at 26, and this terminal is connected, at 27, to the grounded star-point of the secondary windings of the potential transformers 6.

The tripping circuits, according to my invention, are simple. As shown, the make-contact DO of the directional element DO is connected between a suitable source of energy, such as the negative bus (−), and a relaying conductor 28, from which a tripping circuit continues, through the make-contact X1 of the first-zone reactance-element X1, to the tripping-bus 29. From the tripping-bus 29, the trip-circuit is continued through the trip-coil TC, and thence through the auxiliary breaker-switch 3a, to the positive bus (+). A second tripping-circuit includes the make-contact X2 of the second-zone element, in series with the T2 timer-contact, these two contacts being utilized to connect the relaying circuits 28 and 29, thus affording time-delayed tripping, for second-zone faults. A third tripping-circuit is also shown, in the form of the timer-contact T3, which also connects the relaying-circuits 28 and 29, for further back-up protection.

In operation, therefore, my system, as shown in Fig. 1, utilizes a single reactance element (or two, if two different balance-points are desired, for two-zone operation). In the event of a single ground-fault, the proper one of the phase-selectors SA, SB or SC will impress the proper line-to-ground voltage on the relay, corresponding to the faulted phase, so that the relay will properly respond to the distance of the ground-fault from the relaying point. In the event of a double line-to-ground fault, I select the voltage of the leading one of the two faulted phases to energize my distance-relay, so that the relay under-responds.

On ground-faults involving all three phases, if the phase-selectors all respond, then no voltage is applied to my distance-relay, and no response is obtained; or if, as in the case of the illustrated negative-sequence phase-selectors, a response is dependent upon the existence of the negative-sequence component, which does not appear in a balanced three-phase fault, none of the phase-selectors will respond, and still no voltage will be applied to any distance-relay. As previously explained, I keep the operating windings of my distance-relays short-circuited, as by means of the VX contacts or any equivalent means, until a voltage is applied to the relays.

It will be observed that no supervisory impedance-element, such as a third-zone impedance-element, is needed, because I utilize a response to the residual current, and the residual current possesses inherent fault-detecting capabilities. The directional element DO also operates as a ground-fault detector.

While I have illustrated my invention in Fig. 1, in connection with phase-selectors SA, SB and SC which directionally compare the corresponding phases of two phase-sequence components of the three-phase line-current, I wish it to be understood, as pointed out in my previously mentioned Patent No. 2,320,861, that I could have utilized phase-sequence components of the three-phase line-voltage rather than phase-sequence components of the three-phase line-current. While the current-components have an advantage in producing larger sequence-components in the event of ground-faults, they have the disadvantage of involving errors due to current-transformer saturation, in the event of severe phase-faults, these errors are avoided when voltage-components are utilized, rather than current-components. I wish it to be also understood that while I have directionally compared the negative and zero-sequence components, I could alternatively have directionally compared other pairs of sequence-components, with advantages and disadvantages some of which are discussed in my aforementioned Patent 2,320,861.

In the description of Fig. 1, particularly with reference to the combination of a response of one phase-selector with a non-response of the next lagging phase-selector, I have discussed the possibility of utilizing accurately responding phase-selectors, as well as the directionally comparing phase-sequence selectors which inaccurately select the sound phase, as well as the leading faulted phase, in the event of a double-ground fault.

In Fig. 2, I have indicated accurately responsive phase-selectors SA', SB' and SC', in the form of under-voltage relays which are energized in response to the several phases of the line-to-ground line-voltages. These relays are normally energized, as illustrated, by being impressed with the line-voltage, which is assumed to be constant, except in the event of a fault, as is a common practice in the operation of the constant-voltage transmission systems.

In Fig. 2, each of the undervoltage phase-selectors SA', SB' and SC' is provided with a normally closed make-contact 30, which corresponds to the back-contacts of the phase-selectors of Fig. 1, said contacts 30 being closed when the undervoltage phase-selector is unresponsive to line-fault conditions. The undervoltage phase-selectors SA', SB' and SC' of Fig. 2 also have back-contacts 30', which correspond to the make-contacts of the phase-selectors of Fig. 1, these contacts 30' being closed only when the phase-selector responds to a line-fault affecting that phase. The several phase-A, phase-B and phase-C circuits 21, 22 and 23 of Fig. 1, are indicated at 21', 22' and 23' of Fig. 2, these circuits being paralleled at the common point 24', which corresponds to the point 24 in Fig. 1.

In Fig. 2, the fault-responsive back-contact 30' of each of the phase-selectors SA', SB' and SC' is in series with the normally closed make-contact 30 of the phase-selector corresponding to the next leading phase. Thus, for example, the phase-A voltage-circuit 21' includes the SA' back-contact 30', which is closed in the event of a fault affecting phase A, and the SC' make-contact 30, which is closed when there is no fault on phase C of the line-conductors. Otherwise, the circuits and connections of Fig. 2 are as shown in Fig. 1.

In the operation of the phase-selector system shown in Fig. 2, it will be observed that a single ground-fault will cause a dropping-out response of only one of the phase-selectors SA', SB' and SC', corresponding to the faulted phase, and energizing the relay-voltage circuit 21' 22' or 23' which corresponds to that particular faulted phase.

In the event of a double-ground fault, the two undervoltage phase-selectors corresponding to the two faulted phases will have a drop-out response, but the pairs of serially connected contacts will select only that line-to-ground relaying-voltage which corresponds to the leading one of the faulted phases. Thus, in the event of a ground-fault on phases B and C, the phase-selectors SB' and SC' will respond by dropping out, but the phase-C fault-selector SC' is made ineffective by having its fault-indicating back-contact 30' in series with the faultfree-indicating make-contact of the phase-B selector SB', this make-contact being opened on account of a dropping-out response of said phase-B selector SB'. The phase-B fault-selector SB' will select the relay-voltage circuit 22', corresponding to the phase-B line-to-ground voltage, because its fault-indicating back-contact 30' is in series with the unresponsive, closed make-contact of the phase-selector SA' corresponding to the sound phase A.

In the event of a phase-to-phase fault involving no ground-current, my undervoltage-selectors SA' SB' and SC' of Fig. 2 will likewise respond to the two faulted phases, but since there is no ground-current, the reactance elements X1 and X2, which are shown in Fig. 1, will receive no relaying current, and hence will not respond.

In the event of a three-phase fault, either with or without ground-current, all three of my undervoltage phase-selectors SA', SB' and SC' of Fig. 2 will respond by dropping out, and hence no relaying voltage will be selected and applied to the reactance elements X1 and X2, because the selection of a relaying voltage necessitates a response of one phase-selector, and a non-response of the phase-selector corresponding to the next leading phase.

In Fig. 3, I have illustrated a form of embodiment of my invention in which is utilized a kind of phase-selector which responds accurately to single-ground faults, and which responds only to the leading phase of double-ground faults. To this end, I utilize phase-selectors SA", SB" and SC" which differentially compare the magnitude of its phase of a three-phase quantity derived from the line (either current or voltage), with the magnitude of another phase, and preferably the next leading phase, of the same three-phase quantity. While, as in Fig. 1, either line-currents or line voltages may be responded to by the differential phase-selectors of Fig. 3, I have chosen to illustrate, in Fig. 3, the use of the line-to-ground voltages, for energizing the respective differential phase-selector elements SA", SB" and SC". I have also chosen to couple the phase-A response of the phase-selector SA" with a response to the next leading phase, C, as that, in the event of a double-ground fault, the phase-A selector SA" will respond only when the C-phase is the sound phase, that is, when said phase-A is the leading one of the two faulted phases A and B.

Since the differential phase-selectors SA″, SB″ and SC″ of Fig. 3 are voltage-comparing elements, each element must respond to a reduction in the phase of the line-voltage corresponding to its phase. Each of the phase-selector elements SA″, SB″ and SC″ is, therefore, provided with a restraint-winding 31 which is responsive to the line-to-ground relaying-voltage corresponding to its own phase, and it has an operating winding 32 which is responsive to the line-to-ground relaying-voltage in the next leading phase. Thus, the phase-A selector SA″ has its restraining-winding 31 responsive to the phase-A voltage, and its operating winding 32 responsive to the phase-C voltage.

In Fig. 3, each of the selector-elements SA″, SB″ and SC″ has only a single contact, which is a make-contact 33, corresponding to the make-contacts of the phase-selector elements in Fig. 1. No back-contacts are utilized on the phase-selector elements SA″, SB″ and SC″ of Fig. 3. Each of the three relay-voltage circuits 21″, 22″ and 23″ has only one phase-selector contact in said circuit, namely the make-contact 33 corresponding to its own phase-selector.

In operation, the phase-selectors SA″, SB″ and SC″ of Fig. 3 properly select and apply the line-to-ground relaying-voltage corresponding to the faulted phase, in the event of a single ground-fault on the protected system. In the event of a two-phase fault, only one of the phase-selectors SA″, SB″ and SC″ responds, namely the one corresponding to the leading one of the two faulted phases. In the event of a three-phase fault, none of the phase-selectors SA″, SB″ and SC″ responds, unless there is a considerable unbalance in the three-phase fault. Otherwise the operation of the system shown in Fig. 3 is as fully described in connection with Fig. 1.

While I have illustrated my invention in several preferred forms of embodiment, and have indicated some of the modifications of which it is susceptible, I desire it to be understood that my invention is susceptible of embodiment in several different forms, some of which have been suggested in the course of the description. I desire, therefore, that the appended claims shall be accorded the broadest construction consistent with their language.

I claim as my invention:

1. Terminal protective equipment for protecting a terminal of a three-phase line-section, comprising the combination, with a line-segregating circuit-interrupting means at that terminal of the line-section, of circuit-interrupter-controlling relaying-means comprising a single-phase distance-responsive ground-fault relaying means, means for supplying to said ground-fault relaying-means a single-phase relaying-current dependent upon the zero-sequence component of the line-current, means for supplying to said ground-fault relaying-means any one of a plurality of single-phase relaying-voltages dependent upon the different line-to-ground line-voltages respectively, preventive means for normally rendering said ground-fault relaying-means inoperative, ground-fault phase-selector means for selecting and applying one of said relaying-voltages to said ground-fault relaying-means, and means for removing the effect of said preventive means when one of said relaying-voltages is applied to said ground-fault relaying-means.

2. The invention as defined in claim 1, characterized by said phase-selector means being operative to respond to single ground-faults by selecting and applying the relaying-voltage dependent upon the line-to-ground line-voltage of the faulted phase.

3. The invention as defined in claim 1, characterized by said phase-selector means being operative to respond to single ground-faults by selecting and applying the relaying-voltage dependent upon the line-to-ground line-voltage of the faulted phase, and being operative to respond to double ground-faults by selecting and applying the relaying-voltage dependent upon the line-to-ground voltage of the leading one of the two faulted phases.

4. The invention as defined in claim 1, characterized by said phase-selector means including a separately responding means for each phase, and means for selecting and applying each relaying-voltage in response to a response of the phase-selector means for its phase and a non-response of the phase-selector means for another phase.

5. The invention as defined in claim 1, characterized by said phase-selector means including a separately responding means for each phase, and means for selecting and applying each relaying-voltage in response to a response of the phase-selector means for its phase and a non-response of the phase-selector means for the next lagging phase.

6. The invention as defined in claim 1, characterized by said phase-selector means including a separately responding directional means for each phase, each of said directional means comparing the direction of its phase of one phase-sequence component with a phase of another phase-sequence component of a three-phase quantity derived from the line.

7. The invention as defined in claim 1, characterized by said phase-selector means including a separately responding undervoltage means for each phase, whereby a ground-fault is responded to by a dropping-out of the corresponding undervoltage means.

8. The invention as defined in claim 1, characterized by said phase-selector means including a separately responding differential means for each phase, each of said differential means comparing the magnitude of its phase of a three-phase quantity derived from the line, with the magnitude of another phase of the same three-phase quantity.

9. The invention as defined in claim 1, characterized by said phase-selector means including a separately responding differential means for each phase, each of said differential means comparing the magnitude of its phase of a three-phase quantity derived from the line, with the magnitude of the next leading phase of the same three-phase quantity, whereby it responds to single ground-faults by selecting the faulted phase, and it responds to double ground-faults by selecting the leading one of the two faulted phases.

10. The invention as defined in claim 1, characterized by said phase-selector means including a separately responding differential relay for each phase, each of said differential relays having means for producing a restraint which is responsive to its phase of the line-voltage, and for producing an operating force which is responsive to another phase of the line-voltage.

11. The invention as defined in claim 1, characterized by said phase-selector means including a separately responding differential relay for each phase, each of said differential relays having means for producing a restraint which is responsive to its phase of the line-voltage, and for producing an operating force which is responsive to the next leading phase of the line-voltage, whereby it responds to single ground-faults by selecting the faulted phase, and it responds to double ground-faults by selecting the leading one of the two faulted phases.

12. A ground-fault phase-selector apparatus for selectively responding to ground-fault conditions on a three-phase line, comprising a separately responding differential means for each phase, each of said differential means comparing the magnitude of its phase of a three-phase quantity derived from the line, with the magnitude of another phase of the same three-phase quantity, in combination with relay-circuit means for utilizing the responses of the several differential means for performing a selective relaying operation according to which phase is faulted to ground.

13. A ground-fault phase-selector apparatus for selectively responding to ground-fault conditions on a three-phase line, comprising a separately responding differential means for each phase, each of said differential means comparing the magnitude of its phase of a three-phase quantity derived from the line, with the magnitude of the next leading phase of the same three-phase quantity, whereby it responds to single ground-faults by selecting the faulted phase, and it responds to double ground-faults by selecting the leading one of the two faulted phases, in combination with relay-circuit means for utilizing the responses of the several differential means for performing a selective relaying operation according to which phase is faulted to ground.

14. A ground-fault phase-selector apparatus for selectively responding to ground-fault conditions on a three-phase line, comprising a separately responding differential relay for each phase, each of said differential relays having means providing a restraint which is responsive to its phase of the line-voltage, and having means providing an operating force which is responsive to another phase of the line-voltage, in combination with relay-circuit means for utilizing the responses of the several differential means for performing a selective relaying operation according to which phase is faulted to ground.

15. A ground-fault phase-selector apparatus for selectively responding to ground-fault conditions on a three-phase line, comprising a separately responding differential relay for each phase, each of said differential relays having means providing a restraint which is responsive to its phase of the line-voltage, and having means providing an operating force which is responsive to the next leading phase of the line-voltage, whereby it responds to single ground-faults by selecting the faulted phase, and it responds to double ground-faults by selecting the leading one of the two faulted phases, in combination with relay-circuit means for utilizing the responses of the several differential means for performing a selective relaying operation according to which phase is faulted to ground.

16. Relaying-apparatus for ascertaining ground-faults on a three-phase line, comprising a single-phase distance-measuring ground-fault reactance-responsive relaying-means, for responding to the line-reactance of a predetermined phase of the line-conductors, said distance-measuring response being accurate only if a single ground-fault occurs on said predetermined phase, in combination with ground-fault phase-selector means for making a selection of an apparently ground-faulted phase, said phase-selection of the phase-selector means being made without an accurate determination of the distance of the fault by said phase-selector means, and means for obtaining an indication of a joint response of said distance-measuring relaying-means in said predetermined phase, and a selection of that same phase by said phase-selector means.

17. The invention as defined in claim 16, characterized by said phase-selector means being operative to properly select the faulted phase in the event of a single ground-fault, and being operative to select only the leading one of the two faulted phases in the event of a double ground-fault having adequate resistance.

18. The invention as defined in claim 16, characterized by said phase-selector means comprising a separately responding selector-means for each phase, and means for combining a response of the selector-means for a selected phase and a non-response of the selector-means for another phase.

19. The invention as defined in claim 16, characterized by said phase-selector means including a separately responding directional selector-means for each phase, each of said directional selector-means comparing the direction of its phase of one phase-sequence component with a phase of another phase-sequence component of a three-phase quantity derived from the line.

20. The invention as defined in claim 16, characterized by said phase-selector means comprising a plurality of ground-fault phase-selector relays, one for each phase, each being directionally responsive to its own phase of the negative and zero phase-sequence components of a three-phase quantity derived from the line, and means for combining a response of the selector-means for a selected phase and a non-response of the selector-means for the next lagging phase.

SHIRLEY L. GOLDSBOROUGH.